(12) United States Patent
Albert

(10) Patent No.: US 8,162,004 B2
(45) Date of Patent: Apr. 24, 2012

(54) VALVE WITH OPERATING MEANS BETWEEN TWO OUTLET PASSAGES

(75) Inventor: Laurent Albert, Vallangoujard (FR)

(73) Assignee: Valeo Systemes de Controle Moteur, Cergy Pontoise Cedex (FR)

( * ) Notice: Subject to any disclaimer, the term of this patent is extended or adjusted under 35 U.S.C. 154(b) by 895 days.

(21) Appl. No.: 12/091,775

(22) PCT Filed: Nov. 30, 2006

(86) PCT No.: PCT/FR2006/002621

§ 371 (c)(1),
(2), (4) Date: Apr. 28, 2008

(87) PCT Pub. No.: WO2007/063221

PCT Pub. Date: Jun. 7, 2007

(65) Prior Publication Data

US 2008/0296525 A1    Dec. 4, 2008

(30) Foreign Application Priority Data

Dec. 2, 2005  (FR) .................................. 05 12236

(51) Int. Cl.
  *F16K 49/00*  (2006.01)
(52) U.S. Cl. ...................... 137/625.44; 137/340; 60/320
(58) Field of Classification Search .................. 137/334, 137/340, 625.44, 875, 876; 60/288, 320
See application file for complete search history.

(56) References Cited

U.S. PATENT DOCUMENTS

| 470,489 | A | * | 3/1892 | Henkel ................. 137/119.07 |
| 2,999,640 | A | * | 9/1961 | Waterfill ..................... 236/13 |
| 4,388,950 | A | * | 6/1983 | Stouffer et al. ............. 137/829 |
| 4,401,301 | A | * | 8/1983 | Hayskar ....................... 271/96 |
| 4,807,665 | A | * | 2/1989 | Schiel ..................... 137/625.4 |
| 5,016,664 | A | * | 5/1991 | Cole ............................. 137/1 |
| 5,165,450 | A | | 11/1992 | Marrelli |
| 5,740,785 | A | | 4/1998 | Dickey et al. |
| 7,182,101 | B2 | * | 2/2007 | Alacqua et al. ............. 137/875 |
| 2001/0047834 | A1 | | 12/2001 | Menin et al. |
| 2005/0241702 | A1 | | 11/2005 | Blomquist et al. |

FOREIGN PATENT DOCUMENTS

| AU | 506 962 B2 | 1/1980 |
| DE | 198 58 626 C1 | 5/2000 |
| EP | 0 625 659 A | 11/1994 |
| EP | 1 273 786 A | 1/2003 |
| FR | 2 854 200 A | 10/2004 |
| GB | 2 125 936 A | 3/1984 |

OTHER PUBLICATIONS

International Search Report from PCT/FR2006/002621 mailed Mar. 20, 2007 (6 pages).

* cited by examiner

*Primary Examiner* — John Fox
(74) *Attorney, Agent, or Firm* — Osha • Liang LLP

(57) ABSTRACT

A valve has a body, a fluid inlet duct delimited by the body, two fluid outlet ducts into which the fluid inlet duct opens, an intersection formed by the two fluid outlet ducts, a butterfly valve disposed in the intersection, and a motor, to which the butterfly valve is connected, for actuating the butterfly valve between a first extreme position in which the butterfly valve directs the fluid mainly toward the first outlet duct and a second extreme position in which the butterfly valve directs the fluid mainly toward the second outlet duct. The motor is placed between the outlet ducts in the vicinity of a connecting zone connecting the two outlet ducts to one another. The butterfly valve is mounted in front of the connecting zone so that the butterfly valve forms a screen against the fluid for the connecting zone.

4 Claims, 2 Drawing Sheets

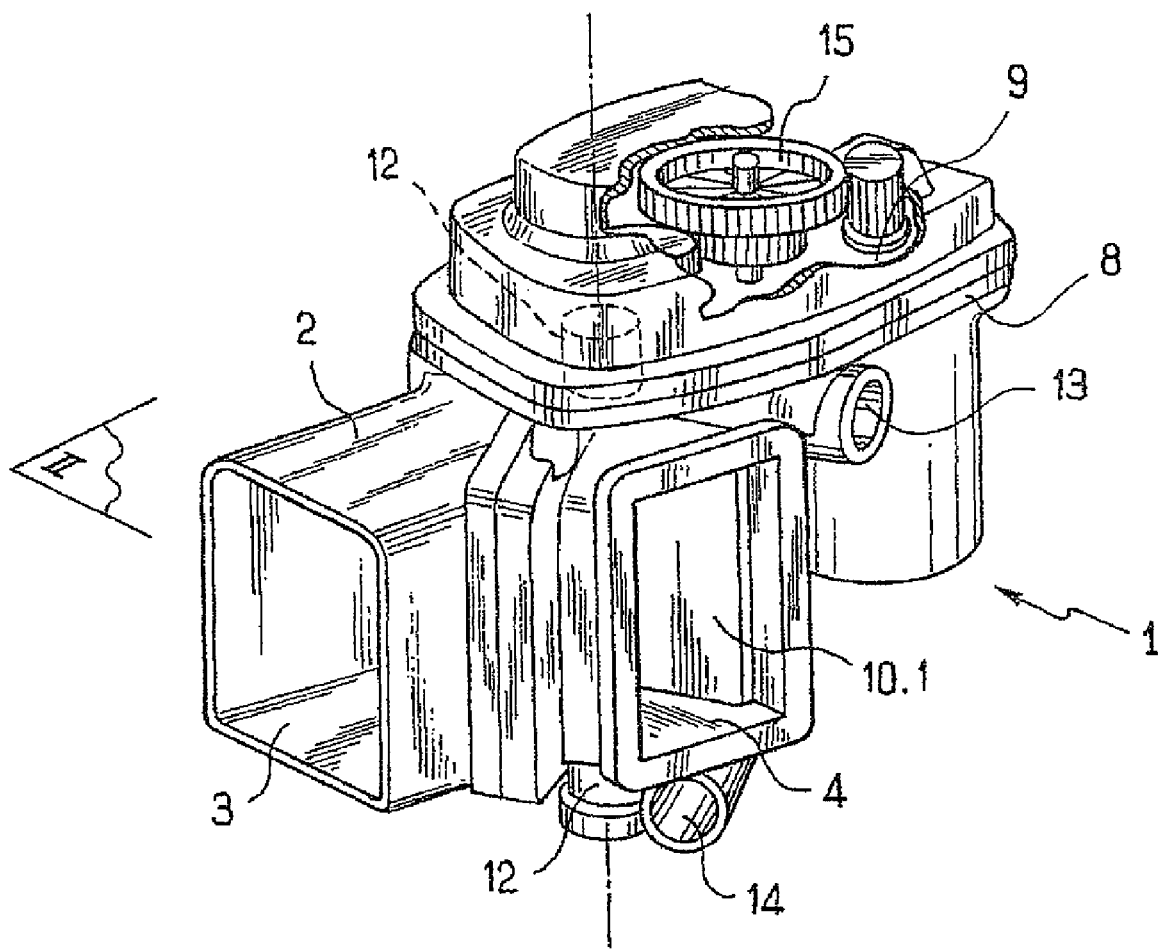
FIG_1

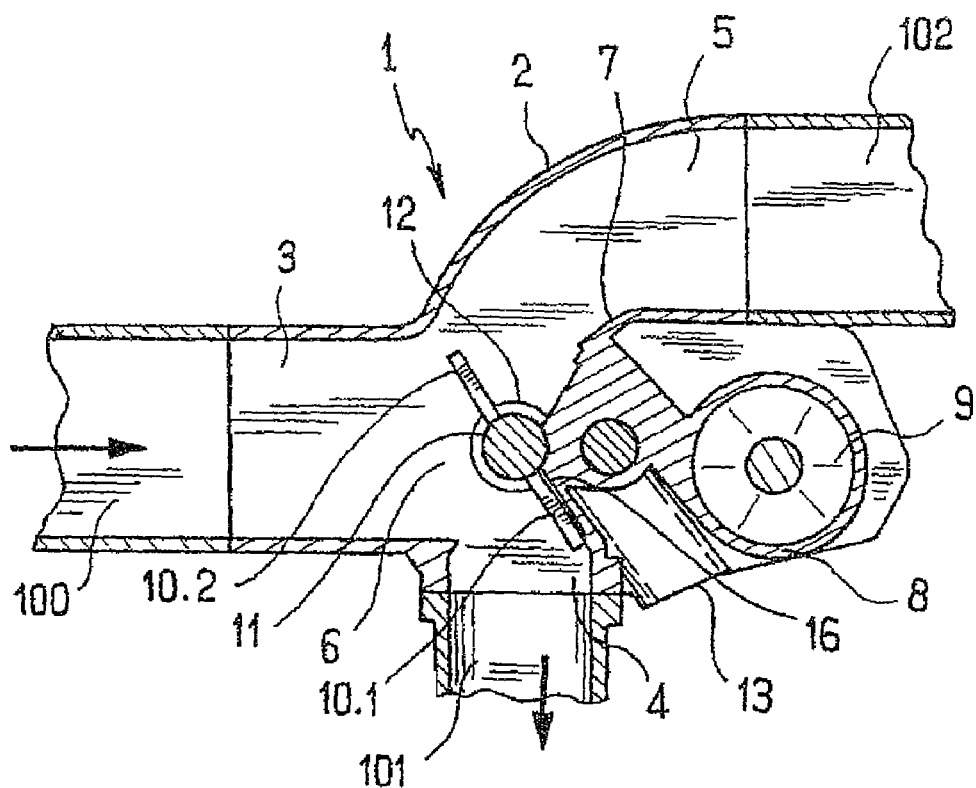
FIG_2
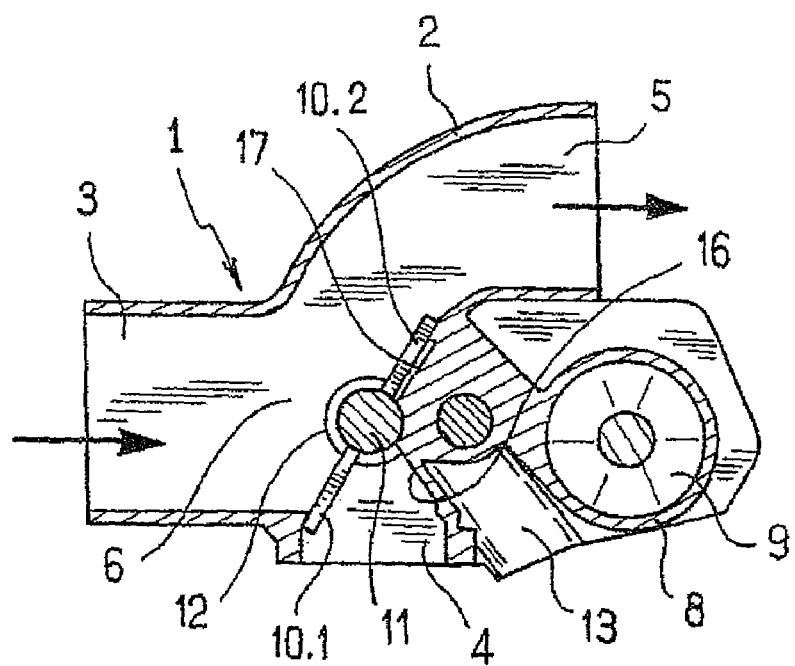
FIG_3

VALVE WITH OPERATING MEANS BETWEEN TWO OUTLET PASSAGES

The present invention relates to a valve that can be used for example in a device for recirculating the exhaust gases of a motor vehicle internal combustion engine.

BACKGROUND OF THE INVENTION

An Exhaust Gas Recirculation device (or EGR) usually comprises a cooled channel and an uncooled channel connected on the one hand to the inlet circuit of the internal combustion engine and on the other hand to a tapping made in the high pressure zone of the exhaust manifold of the internal combustion engine. The two channels are connected to one another by a valve, called the "by-pass valve", that regulates the flow of the exhaust gases between the cooled channel and the uncooled channel. Such a recirculation device allows a portion of the exhaust gases to be reutilized in the mixture fed into the internal combustion engine.

From now onwards, the antipollution standards make it necessary to recirculate a larger portion of the exhaust gases. The current architecture has reached its limits with respect to the quantity of exhaust gas that it is possible to recirculate.

To improve the recirculation of the exhaust gases, thought has been given to connecting a recirculation device to the low pressure portion of the exhaust manifold, that is to say downstream of the exhaust gas expansion zone, in order to direct the majority of the exhaust gases toward the internal combustion engine inlet circuit. It is therefore necessary to provide a valve on the low pressure portion of the exhaust manifold making it possible to direct the exhaust gases either toward the outside or toward the recirculation device. However, in this portion of the manifold, the exhaust gases undergo depollution treatments, particularly a post-combustion, that raise their temperature.

The valve must be arranged to withstand this temperature, which increases the cost of the valve and more particularly that of the members controlling the latter such as the actuation motor and the means of transmitting the movement from the motor to the butterfly valve. One solution would be to distance the control members as much as possible from the ducts in which the hot exhaust gases travel. However, it is, on the contrary, desirable for the valve to have a structure that is compact and neatly arranged on the exhaust manifold in order to limit the space requirement. Such a structure promotes a high temperature of the valve and makes it difficult to cool.

OBJECT OF THE INVENTION

One object of the invention is to propose a valve satisfying the above requirements.

BRIEF DESCRIPTION OF THE INVENTION

For this reason, according to the invention, a valve is provided comprising a body delimiting a fluid inlet duct opening into two fluid outlet ducts forming an intersection in which a butterfly valve is mounted connected to a motor for actuating the butterfly valve between a first extreme position in which the butterfly valve directs the fluid mainly toward the first outlet duct and a second extreme position in which the butterfly valve directs the fluid mainly toward the second outlet duct, the motor being placed between the outlet ducts in the vicinity of a zone connecting the outlet ducts to one another and the butterfly valve being mounted in front of the connecting zone so that the butterfly valve forms a screen against the fluid for this connecting zone.

Therefore, the position of the motor between the outlet ducts in the vicinity of the connection of the latter makes it possible to obtain a compact structure around the outlet ducts. The butterfly valve, by forming a screen, prevents the connecting zone from being in direct contact with the fluid transported and in this way limits the influence of the temperature of the fluid on that of the motor.

Preferably, the motor is contained in a housing having a wall forming the connecting zone of the outlet ducts.

The compactness of the valve is therefore further enhanced.

According to a particular embodiment, the housing is provided with means for cooling the wall forming the connecting zone.

The cooling means make it possible to keep the motor and the means for transmitting the movement to the butterfly valve at an optimal temperature. In addition, these cooling means make it possible to use relatively common elastomer sealing elements instead of elastomer elements made of a high heat-resistant material. These sealing elements provide a satisfactory seal for a relatively low cost.

Advantageously, the butterfly valve has at least one portion extending along at least one portion of the wall of the housing when the butterfly valve is in its extreme positions.

The butterfly valve may then be subjected at least in part to the action of the cooling means directly by conduction or at least indirectly. This also limits the risk that the transported fluid circulates between the butterfly valve and the wall.

Again preferably, the butterfly valve is supported by a spindle having ends received in bearings subjected to the cooling means.

The cooling of the bearings limits the risk of the latter seizing and allows cooling by conduction of the spindle and of the butterfly valve.

Again advantageously, the butterfly valve is supported by a spindle extending in the immediate vicinity of the wall along a portion of the latter.

Cooling of the spindle by radiation is therefore possible.

Other features and advantages of the invention will emerge on reading the following description of a particular nonlimiting embodiment of the invention.

BRIEF DESCRIPTION OF THE DRAWINGS

Reference will be made to the appended drawings, amongst which:

FIG. 1 is a view in perspective of the valve according to the invention with cutaway, FIG. 2 is a schematic top view of this valve, in section along the plane II of FIG. 1, for a first position of the butterfly valve, FIG. 3 is a view similar to FIG. 2 for a second position of the butterfly valve.

DETAILED DESCRIPTION OF THE INVENTION

With reference to the figures, the valve generally indicated by reference number 1 is here designed to be placed on the low pressure portion of the exhaust manifold 100 of an internal combustion engine in order to direct the exhaust gases either toward the outside or toward a recirculation device 101 (only one portion of the inlet duct of the recirculation device is shown). Taking as an example an internal combustion engine fitted with a turbocharger, the low pressure portion of the exhaust manifold is downstream of the turbocharger turbine.

The valve 1 comprises a body 2 delimiting an inlet duct 3 opening into two outlet ducts 4, 5 forming an intersection 6. The inlet duct 3 has one end provided with means for connecting it to the exhaust manifold 100 on the internal combustion engine side and an opposite end connected to first convergent ends of two outlet ducts 4, 5 having opposite ends provided with means for connecting them respectively to the recirculation device 101 and to the final section 102 of the exhaust manifold 100. The first ends of the outlet ducts 4, 5 are connected substantially forming a right angle whose apex is oriented toward the inlet duct 3.

The internal portion of the right angle is formed by a wall 7 of a housing 8 connecting the outlet ducts 4, 5 in the internal portion of the right angle. The wall 7 therefore forms a zone for connecting the outlet ducts 4, 5. The housing 8 is formed of an aluminum casing incorporating means for cooling it more particularly providing the cooling of the wall 7. These cooling means comprise in this instance a channel having an inlet portion 13 and an outlet portion 14 made in the casing forming the housing 8 in order to allow the circulation of a heat-conducting fluid. The portions 13 and 14 of the cooling channel are in this instance designed to be connected to the cooling circuit of the internal combustion engine.

The housing 8 accommodates a motor 9 for actuating a butterfly valve 10 mounted in the intersection 6 upstream of the wall 7 with reference to a direction of flow of the exhaust gases in the ducts 3, 4, 5. The motor 9 is a direct current electric motor. The butterfly valve 10 is fixedly attached to a spindle 11 that extends in the immediate vicinity and along the wall 7 and that has ends received pivotingly in bearings 12 fixedly attached to the housing 8 so that the bearings 12 benefit at least in part from the cooling provided to the wall 7 by the cooling channel of the housing 8. The cooling channel has its inlet portion 13 and outlet portion 14 that are adjacent to the bearings 12 and in contact with the latter in order to cool said bearings 12. The closeness of the spindle 11 to the wall 7 promotes the cooling of the spindle 11. Preferably the cooling channel passes close to the spindle 11. The spindle 11 is connected to the output shaft of the motor 9 by transmission means of conventional type, in this instance gears 15 mounted on the housing 8 so as to be subjected to the action of the cooling means of the housing 8. The gears 15 are in this instance made of plastic. Beneath the gears, a seal (not visible in the figures) is placed on the spindle 11 in order to form a seal between the spindle 11 and the body 2. The cooling of the spindle 11 allows the use of an elastomer seal. The same applies to the other sealing elements of the valve being able to benefit directly or indirectly from the cooling provided by the cooling means. The sealing elements subjected to higher temperature are made of a highly heat-resistant material such as a ceramic.

The butterfly valve 10 can therefore be moved between a first extreme position in which the butterfly valve 10 directs the fluid mainly toward the outlet duct 4 and a second extreme position in which the butterfly valve 10 directs the fluid mainly toward the outlet duct 5.

In its first extreme position, the butterfly valve 10 has a portion 10.1 extending along the wall 7 on the side of the outlet duct 4 and a portion 10.2 partially blocking the outlet duct 5. The portion 10.1 has a free edge resting against the wall 7. A recess 16 of the wall 7 forms a thin free space left behind the portion 10.1.

In its second extreme position, the butterfly valve 10 has its portion 10.2 extending along the wall 7 on the side of the outlet duct 5 and its portion 10.1 blocking the outlet duct 4. The portion 10.2 has a free edge resting against the wall 7. A recess 17 of the wall 7 forms a thin free space left behind the portion 10.2.

The operation and the control of this valve are conventional.

Naturally, the invention is not limited to the embodiment described but covers any variant included in the context of the invention defined by the claims.

In particular, although the valve of the invention has been described in an application to the recirculation of the exhaust gases, the valve may be used in other applications for regulation or distribution of fluids and particularly for fluids of lower temperatures.

In addition, the housing 8 may be placed in the vicinity of the connecting zone without said connecting zone being formed by a wall of the housing 8. The increase in the space requirement resulting from this positioning of the housing is compensated for by the fact that, by being at a slight distance from the connecting zone, the motor naturally has a lower temperature, which makes it easier to cool. The housing 8 may therefore be separated from the ducts.

Although it has been indicated that the housing of the motor is made of aluminum and the gears of plastic (which makes it possible to have a relatively light valve), it is possible to make these elements of steel.

The body 2 may also be made in one or more parts.

The invention claimed is:

1. A valve comprising:
   a body;
   a fluid inlet duct delimited by the body;
   two fluid outlet ducts into which the fluid inlet duct opens;
   an intersection formed by the two fluid outlet ducts;
   a butterfly valve disposed in the intersection; and
   a motor, to which the butterfly valve is connected, for actuating the butterfly valve between a first extreme position in which the butterfly valve directs the fluid mainly toward the first outlet duct and a second extreme position in which the butterfly valve directs the fluid mainly toward the second outlet duct, the motor being contained in a housing having a wall forming the connecting zone of the two outlet ducts, wherein the housing is provided with a cooling channel for cooling the wall forming the connecting zone, wherein the cooling channel comprises an inlet portion and an outlet portion in a casing of the housing,
   wherein the motor is placed between the outlet ducts in the vicinity of a connecting zone connecting the two outlet ducts to one another,
   wherein the butterfly valve is mounted in front of the connecting zone so that the butterfly valve forms a screen against the fluid for the connecting zone.

2. The valve as claimed in claim 1, wherein the butterfly valve has at least one portion extending along at least one portion of the wall of the housing when the butterfly valve is in the extreme positions.

3. The valve as claimed in claim 1, wherein the butterfly valve is supported by a spindle having ends received in bearings fixedly attached to the housing and subjected to the cooling channel.

4. The valve as claimed in claim 1, wherein the butterfly valve is supported by a spindle extending in the immediate vicinity of the wall along a portion of the latter.

* * * * *